(12) United States Patent  
Konopacki et al.

(10) Patent No.: US 8,272,208 B1
(45) Date of Patent: Sep. 25, 2012

(54) EXHAUST SYSTEM WITH AIR INJECTION

(75) Inventors: Jeffery M. Konopacki, Ripon, WI (US); Jason C. Barta, Menasha, WI (US)

(73) Assignee: Brunswick Corporation, Lake Forest, IL (US)

( * ) Notice: Subject to any disclaimer, the term of this patent is extended or adjusted under 35 U.S.C. 154(b) by 1123 days.

(21) Appl. No.: 11/865,839

(22) Filed: Oct. 2, 2007

(51) Int. Cl.
*F01N 3/00* (2006.01)
(52) U.S. Cl. ................ 60/289; 60/293; 60/307
(58) Field of Classification Search ............ 60/276, 60/289, 291, 293
See application file for complete search history.

(56) References Cited

U.S. PATENT DOCUMENTS

| | | | | |
|---|---|---|---|---|
| 2,071,119 A | * | 2/1937 | Harger | 423/213.2 |
| 3,220,805 A | * | 11/1965 | Lentz et al. | 422/179 |
| 4,027,478 A | * | 6/1977 | Masaki et al. | 60/285 |
| 5,765,368 A | * | 6/1998 | Matsumoto et al. | 60/274 |

* cited by examiner

*Primary Examiner* — Binh Q Tran
*Assistant Examiner* — Diem Tran
(74) *Attorney, Agent, or Firm* — William D. Lanyi

(57) ABSTRACT

An exhaust system for an internal combustion engine includes an air injection port in a designated region of an exhaust conduit having a converging-then-diverging nozzle providing increased exhaust gas flow velocity and decreased exhaust gas pressure. In another embodiment, an injection air conduit is connected between an alternator blower and the engine exhaust conduit to supply injection air to the latter.

8 Claims, 1 Drawing Sheet

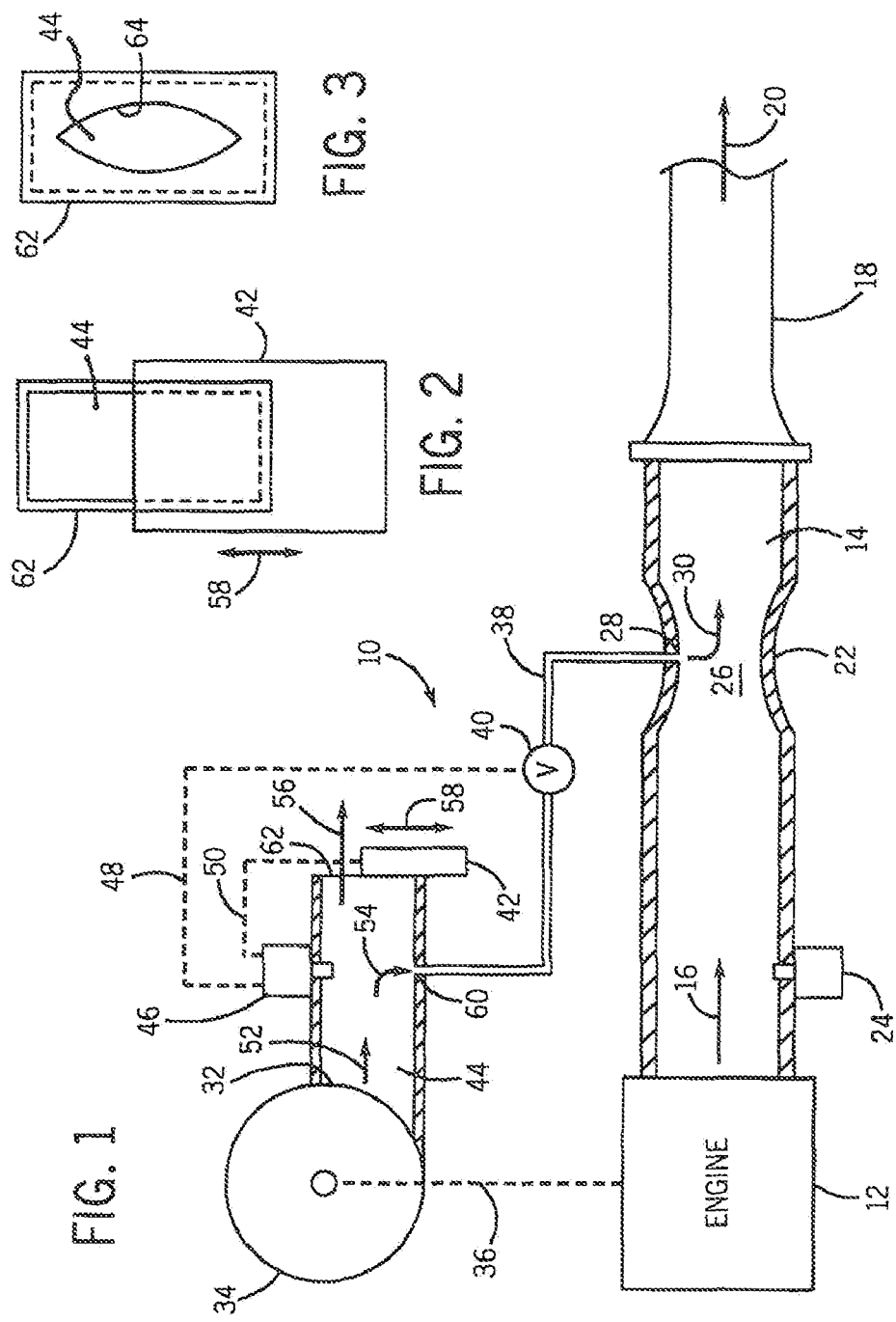

EXHAUST SYSTEM WITH AIR INJECTION

BACKGROUND AND SUMMARY

The invention relates to exhaust systems for internal combustion engines, including for emission control.

Exhaust systems for internal combustion engines typically include an exhaust conduit conducting exhaust gas from the engine through a catalyst. It is known to inject air into the exhaust system upstream of the catalyst. The injection air is provided by an air injection pump and supplied through a regulator valve which in turn is controlled by an oxygen sensor in the exhaust conduit.

The present invention arose during continuing development efforts relating to the above technology, and provides improvements in simplification, cost reduction, and elimination of components.

BRIEF DESCRIPTION OF THE DRAWINGS

FIG. 1 is a schematic illustration of an exhaust system in accordance with the invention.

FIG. 2 is an end view of a component of FIG. 1.

FIG. 3 is like FIG. 2 and shows another embodiment.

DETAILED DESCRIPTION

FIG. 1 shows an exhaust system 10 for an internal combustion engine 12. An exhaust conduit 14 conducts exhaust gas as shown at arrow 16 from engine 12 through a catalyst 18 for discharge as shown at arrow 20. A converging-then-diverging nozzle 22 is provided in the exhaust conduit upstream of catalyst 18. An oxygen sensor 24 is provided in the exhaust conduit upstream of nozzle 22. The exhaust conduit has a designated region 26 of increased exhaust gas flow velocity and decreased exhaust gas pressure at nozzle 22. An air injection port 28 is provided in the designated region 26 and injects air as shown at arrow 30 into exhaust conduit 14 thereat. Exhaust gas flowing downstream (rightwardly in FIG. 1) from engine 12 into designated region 26 has increasing velocity, namely dV>0, and decreasing pressure, namely dP<0. The increasing velocity and decreasing pressure of exhaust gas entering designated region 26 prevents injected air at injection port 28 from traveling back upstream (leftwardly in FIG. 1) to oxygen sensor 24 such that the latter does not receive a false reading. The injected air at port 28 may be provided from various sources, such as an air injection pump as known in the prior art, or from other sources.

In a preferred embodiment of the present invention, injection air at port 28 is supplied from an alternator blower 32 of an alternator 34 driven by engine 12 as schematically shown at dashed line 36, which alternator and its driven connection to an engine is known in the prior art. An injection air conduit 38 is connected between alternator blower 32 and exhaust conduit 14 at port 28 and supplies injection air from the alternator blower to exhaust conduit 14 upstream of catalyst 18. In the preferred embodiment, injection air is supplied from the alternator blower to exhaust conduit 14 without an air injection pump. A regulator valve 40 and/or 42, to be described, regulates the amount of injection air supplied to catalyst 18 from alternator blower 32. The alternator blower has an outlet 44 with a pressure sensor 46 therein. The respective regulator valve is controlled by the pressure sensor, as shown at dashed lines 48, 50. Air from the alternator blower flows as shown at arrow 52 and then may flow as shown at arrow 54 into injection air conduit 38 and/or may flow as shown at arrow 56 for normal discharge.

In one embodiment, a regulator valve 40 is provided in the injection air conduit 38 and controls air flow therethrough to in turn control the amount of injection air at port 28 into exhaust conduit 14. In another embodiment, a regulator valve 42 is provided at the alternator blower outlet 44 and creates backpressure therein. Regulator valve 42 is a gate or flap or the like which is actuatable, e.g. movable upwardly and downwardly as shown at arrow 58, FIGS. 1, 2, as controlled by pressure sensor 46. Valve gate 42 is movable upwardly to an increasingly closed position to in turn increase backpressure in outlet 44 of the alternator blower to in turn increase air pressure in the injection air conduit 38. Valve gate 42 is movable downwardly to an increasingly open position to in turn decrease backpressure in outlet 44 of the alternator blower to in turn decrease air pressure in the injection air conduit 38. In another embodiment, both of the regulator valves 40 and 42 are used.

Injection air conduit 38 has an inlet at 60 receiving injection air from alternator blower 32. Inlet 60 has a flow orifice selected for desired injection air pressure according to alternator blower output. Alternator blower 32 has a discharge port 62 discharging blower output air. Inlet 60 of injection air conduit 38 receives blower output air in parallel with discharge port 62. In an alternate embodiment, FIG. 3, discharge port 62 has a flow orifice, such as shown in oval line at 64, selected for desired backpressure in outlet 44 and desired injection air pressure in injection air conduit 38 received from the alternator blower, whether or not regulator valve 42 is used and whether or not regulator valve 40 is used. In a further embodiment, orifice 64 may be a variable orifice, when regulator valve 42 is added thereto, which variable orifice has a flow area which may be decreased (by moving flapper or gate 42 upwardly) to increase backpressure in outlet 44 to increase air pressure in injection air conduit 38, and which variable orifice has a flow area which may be increased (by moving gate 42 downwardly) to decrease backpressure in outlet 44 to decrease air pressure in injection air conduit 38. Variable orifice 64 at regulator valve 42 is preferably controlled by pressure sensor 46.

In the foregoing description, certain terms have been used for brevity, clearness, and understanding. No unnecessary limitations are to be implied therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims.

What is claimed is:

1. An exhaust system for an internal combustion engine, comprising an exhaust conduit conducting exhaust gas from said engine through a catalyst, an alternator driven by said engine and having an alternator blower, an injection air conduit connected between said alternator blower and said exhaust conduit and supplying injection air from said alternator blower to said exhaust conduit upstream of said catalyst, and wherein said injection air conduit has an inlet receiving injection air from said alternator blower, and said inlet has a flow orifice selected for desired injection air pressure according to alternator blower output.

2. An exhaust system for an internal combustion engine, comprising an exhaust conduit conducting exhaust gas from said engine through a catalyst, an alternator driven by said engine and having an alternator blower, an injection air conduit connected between said alternator blower and said exhaust conduit and supplying injection air from said alternator blower to said exhaust conduit upstream of said catalyst, and wherein said alternator blower has an outlet with a discharge port discharging blower output air, said injection air conduit has an inlet receiving blower output air in parallel with said discharge port, and said discharge port has a flow orifice selected for desired injection air pressure in said injection air conduit received from said alternator blower.

3. The exhaust system according to claim 2 wherein said orifice is a variable orifice having a flow area which may be decreased to increase backpressure in said outlet to increase air pressure in said injection air conduit.

4. The exhaust system according to claim 2 comprising a pressure sensor in said outlet, and wherein said variable orifice is controlled by said pressure sensor.

5. An exhaust system for an internal combustion engine, comprising an exhaust conduit conducting exhaust gas from said engine through a catalyst, a converging-then-diverging nozzle in said exhaust conduit upstream of said catalyst, an oxygen sensor in said exhaust conduit upstream of said nozzle, said exhaust conduit having a designated region of increased exhaust gas flow velocity and decreased exhaust gas pressure at said nozzle, an air injection port in said designated region and injecting air into said exhaust conduit thereat, an alternator driven by said engine and having an alternator blower, an injection air conduit connected between said alternator blower and said exhaust conduit at said injection port and supplying injection air from said alternator blower to said exhaust conduit at said injection port; and wherein said alternator blower has an outlet with a discharge port discharging blower output air, said injection air conduit has an inlet receiving blower output air, and said discharge port has a flow orifice selected for desired injection air pressure in said injection air conduit received from said alternator blower.

6. The exhaust system according to claim 5 wherein said orifice is a variable orifice having a flow area which may be decreased to increase backpressure in said outlet to increase air pressure in said injection air conduit.

7. The exhaust system according to claim 6 comprising a pressure sensor in said outlet, and wherein said variable orifice is controlled by said pressure sensor.

8. An exhaust system for an internal combustion engine, comprising:
- an exhaust conduit conducting exhaust gas from said engine;
- an alternator driven by said engine and having an alternator blower; and
- an injection air conduit connected between said alternator blower and said exhaust conduit and supplying injection air from said alternator blower to said exhaust conduit;
- wherein said injection air conduit has an inlet receiving injection air from said alternator blower, and said inlet has a flow orifice selected for desired injection air pressure according to alternator blower output.

* * * * *